US 11,577,318 B2

(12) United States Patent
Barnes et al.

(10) Patent No.: US 11,577,318 B2
(45) Date of Patent: Feb. 14, 2023

(54) ADDITIVE MANUFACTURING PROCESSES WITH CLOSED-LOOP CONTROL

(71) Applicant: HEWLETT-PACKARD DEVELOPMENT COMPANY, L.P., Spring, TX (US)

(72) Inventors: Arthur H. Barnes, Vancouver, WA (US); Wesley R. Schalk, Vancouver, WA (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 69 days.

(21) Appl. No.: 16/607,947

(22) PCT Filed: Jul. 25, 2018

(86) PCT No.: PCT/US2018/043788
§ 371 (c)(1),
(2) Date: Oct. 24, 2019

(87) PCT Pub. No.: WO2020/023037
PCT Pub. Date: Jan. 30, 2020

(65) Prior Publication Data
US 2021/0354201 A1    Nov. 18, 2021

(51) Int. Cl.
*B22F 10/20* (2021.01)
*B33Y 50/02* (2015.01)
*B22F 10/62* (2021.01)
*B22F 10/14* (2021.01)
*B22F 10/85* (2021.01)
(Continued)

(52) U.S. Cl.
CPC .............. *B22F 10/20* (2021.01); *B22F 10/14* (2021.01); *B22F 10/368* (2021.01); *B22F 10/62* (2021.01); *B22F 10/64* (2021.01); *B22F 10/85* (2021.01); *B22F 12/50* (2021.01); *B22F 12/90* (2021.01); *B29C 64/291* (2017.08);
(Continued)

(58) Field of Classification Search
CPC .................................................. B29C 64/393
See application file for complete search history.

(56) References Cited

U.S. PATENT DOCUMENTS 9,931,697 B2    4/2018  Levin et al.
2016/0332384 A1*  11/2016  De Pena ................ B33Y 30/00
(Continued)

FOREIGN PATENT DOCUMENTS

WO    WO2015108555 A1    7/2015
WO    WO2015196903 A1    12/2015
(Continued)

*Primary Examiner* — Jacob T Minskey
*Assistant Examiner* — Adrien J Bernard
(74) *Attorney, Agent, or Firm* — Shook, Hardy & Bacon L.L.P.

(57) ABSTRACT

In some examples, an additive manufacturing process may be operated by a method that includes depositing a plurality of preliminary layers of build material over a build surface and applying thermal energy governed by closed-loop control to heat the preliminary layers. The method includes analyzing a temperature distribution across a layer of the preliminary layers to map the locations of any hot spots relative to the build surface. The method includes selecting a spray pattern to apply a cooling agent to the mapped locations.

8 Claims, 8 Drawing Sheets

(51) Int. Cl.
*B22F 10/64* (2021.01)
*B22F 10/368* (2021.01)
*B22F 12/90* (2021.01)
*B29C 64/291* (2017.01)
*B29C 64/393* (2017.01)
*B22F 12/50* (2021.01)
*B33Y 10/00* (2015.01)
*B33Y 30/00* (2015.01)

(52) U.S. Cl.
CPC ............ *B29C 64/393* (2017.08); *B33Y 50/02* (2014.12); *B33Y 10/00* (2014.12); *B33Y 30/00* (2014.12)

(56) References Cited

U.S. PATENT DOCUMENTS

| | | |
|---|---|---|
| 2017/0050382 A1 | 2/2017 | Minardi et al. |
| 2017/0057170 A1 | 3/2017 | Gupta et al. |
| 2018/0065297 A1 | 3/2018 | Zhao et al. |
| 2018/0071986 A1 | 3/2018 | Buller et al. |
| 2018/0095450 A1 | 4/2018 | Lappas et al. |

FOREIGN PATENT DOCUMENTS

| | | |
|---|---|---|
| WO | WO2016049621 A1 | 3/2016 |
| WO | WO2017091830 A1 | 6/2017 |
| WO | WO2017196345 A1 | 11/2017 |

\* cited by examiner

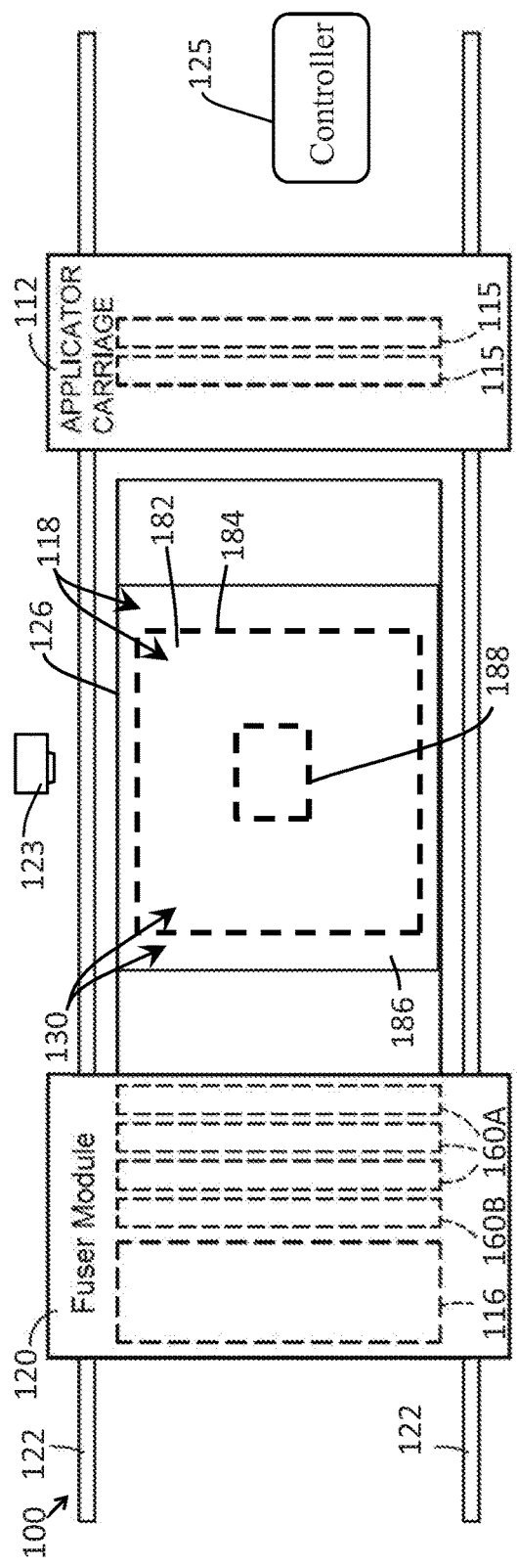
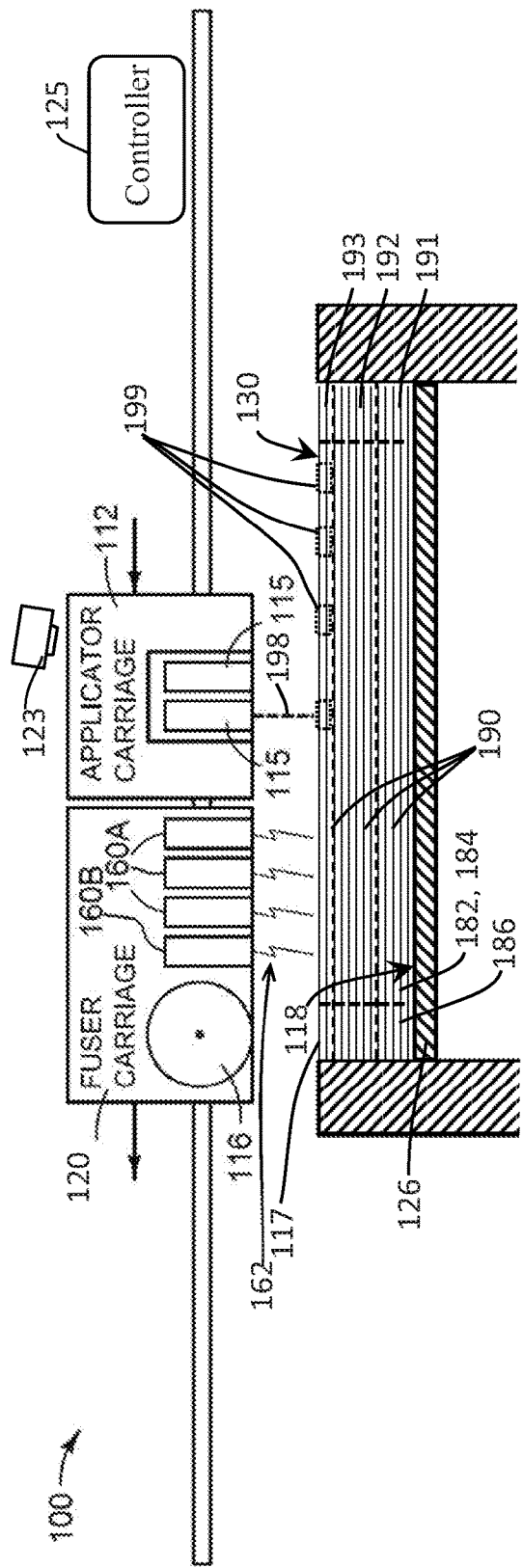

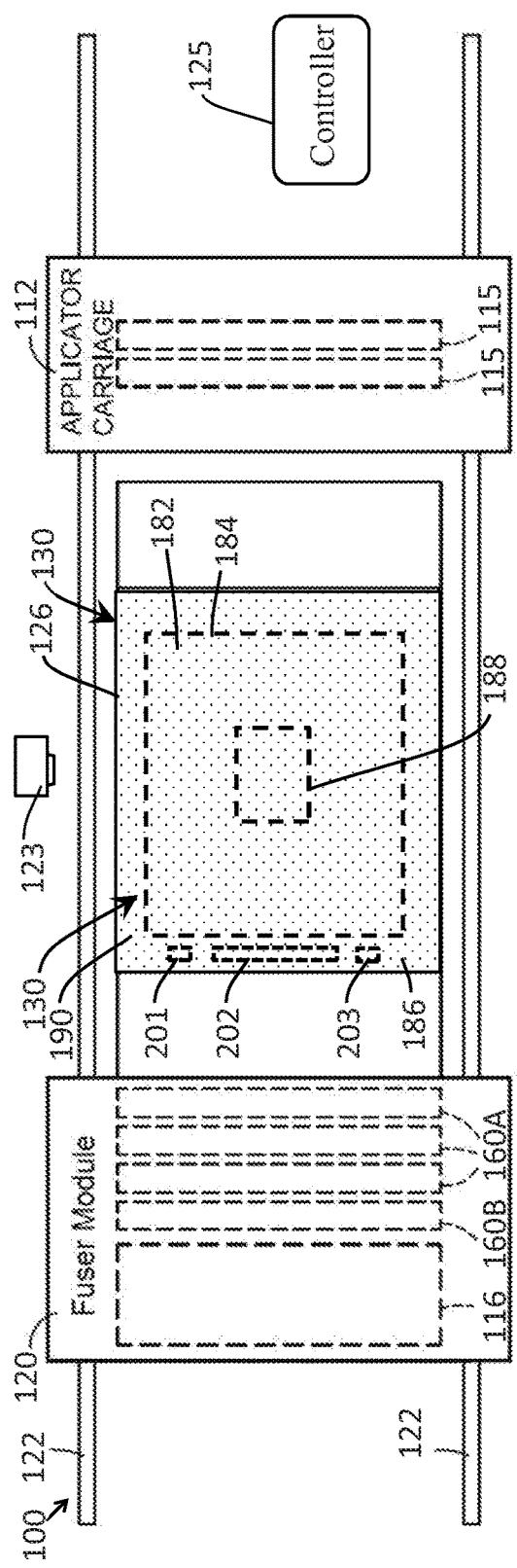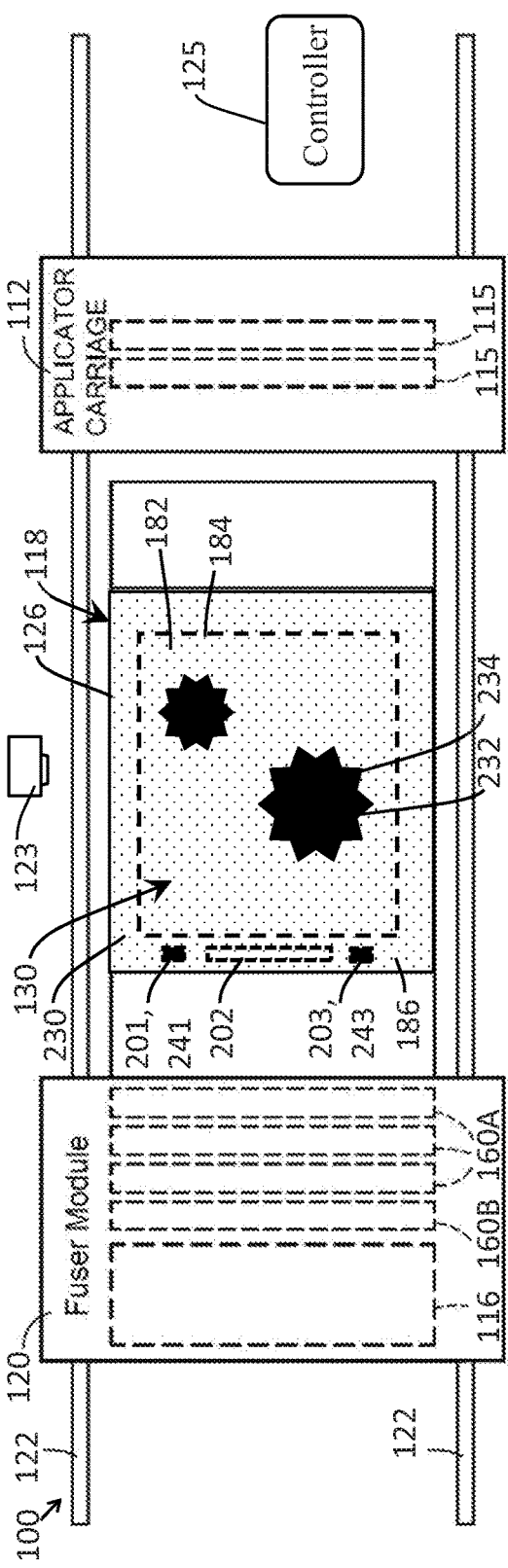

ive Manufacturing Processes with Closed-Loop Control

CROSS-REFERENCE TO RELATED APPLICATIONS

The present application relates to Patent Cooperation Treaty Patent Application No. PCT/US2017/055105, which was filed Oct. 4, 2017, is titled "ADDITIVE MANUFACTURING," and is hereby incorporated herein by reference in its entirety. The present application also relates Patent Cooperation Treaty Patent Application No. PCT/US2018/037962, which was filed Jun. 17, 2018, is titled "ADDITIVE MANUFACTURING," and is also hereby incorporated herein by reference in its entirety.

BACKGROUND

A three-dimensional (3D) printer, which may also be called an additive manufacturing process, may include a receiving platform, a dispensing device (to distribute a build material onto the receiving platform), a liquid applicator (e.g., a print head), a thermal imaging device, and a heater. The heater is to soften, melt, or fuse portions of the build material. In some cases, softening, melting, or fusing is performed with the aid of a fusing agent or a detailing or cooling agent, which may be sprayed or printed on the build material by the liquid applicator.

BRIEF DESCRIPTION OF THE DRAWINGS

Various examples are described below referring to the following figures:

FIG. 4 shows a top-view schematic representation of the 3D printer of FIG. 1, showing reference regions on the build surface in accordance with various examples;

FIG. 5 shows a side-view schematic representation of the 3D printer of FIG. 1 in partial cross-section, showing layers of build material over the build surface during an initialization process in accordance with various examples;

FIG. 6 shows a top-view schematic representation of the 3D printer of FIG. 1, showing build material and reference regions on the build surface in accordance with various examples;

FIG. 7 shows a top-view schematic representation of the 3D printer of FIG. 1, showing production layers of build material after the initialization process in accordance with various examples;

DETAILED DESCRIPTION

Figure 1:
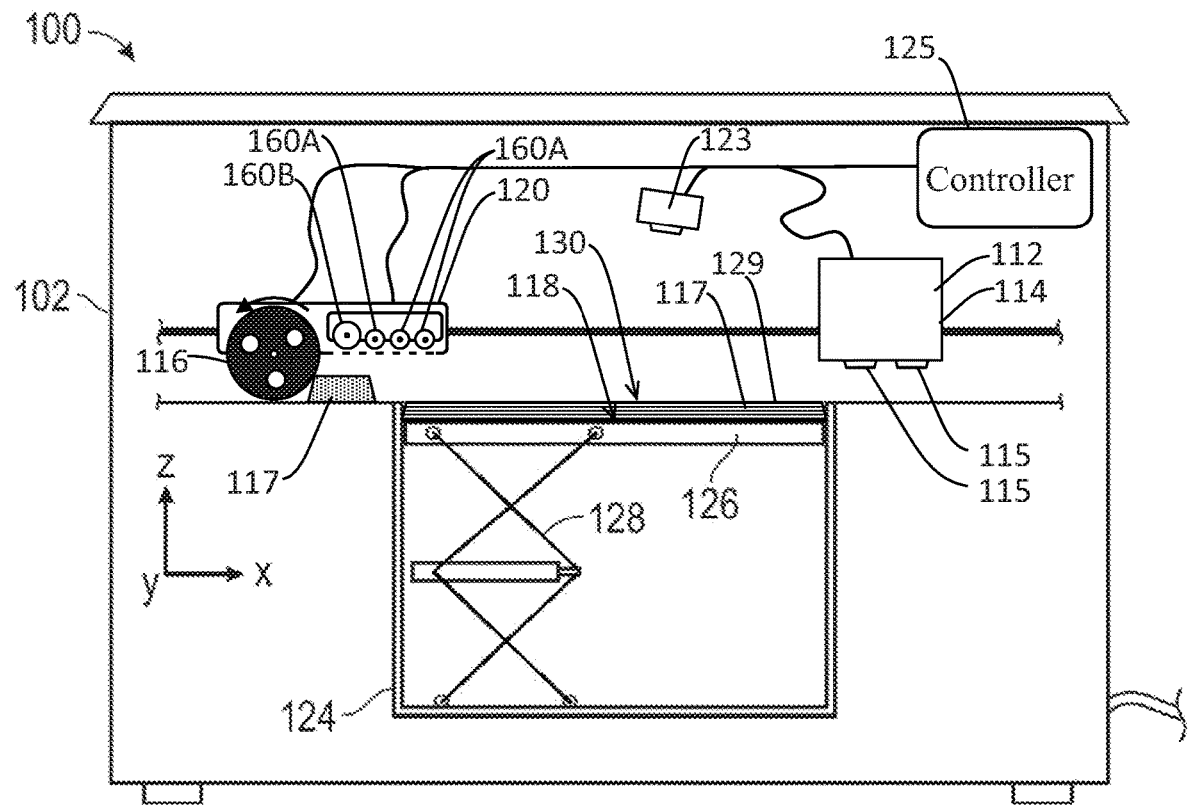
FIG. 1 shows a front view of a 3D printer that includes a controller that is to perform an initialization or finalization process in accordance with various examples.

In the figures, certain features and components disclosed herein may be shown exaggerated in scale or in somewhat schematic form, and some details of certain elements may not be shown in the interest of clarity and conciseness. In some of the figures, to improve clarity and conciseness, a component or an aspect of a component may be omitted or may not have reference numerals identifying the features or components.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections.

As used herein, including in the claims, the word "or" is used in an inclusive manner. For example, "A or B" means any of the following: "A" alone, "B" alone, or both "A" and "B." The terms "heating" and "applying thermal energy" are intended to be synonymous.

In various examples, an additive manufacturing process or 3D printer includes a receiving platform, a dispensing device to distribute a build material on the receiving platform, and a radiant heater to soften, melt, or fuse portions of the build material, which is aided, in some examples, by application of a fusing agent. The build material may be, as examples, a polymer, a metal, or a ceramic. The build material that is to be used may be, as examples, powdered or granular. Some of the 3D printers that use a powdered build material also include a print head with nozzles to apply liquid on the build material. In these printers, the dispensing device periodically distributes a horizontal layer of the build material from a reservoir onto the platform, forming a layer of build material on or over the receiving platform. The print head moves over the receiving platform and its nozzles apply or eject drops of an energy absorbing fusing agent. In some examples the print head may be used for applying drops of a detailing agent (which may include a coolant), a coloring agent, or another liquid in a selected pattern across the layer of the build material on the platform. The selected pattern for the liquids may be based on data derived from a 3D model of an object that is to be built by the printer. In various examples, the dispensing device includes an inkjet-type print head or a plurality of print heads to print the liquid or liquids on the build material to achieve a selected pattern for the liquid(s). Broadly, the printing of a liquid by a print head is an example of a spraying process. A spray pattern for a print head may also be called a print pattern. The heater radiates energy to the deposited build material to melt, sinter, fuse, or otherwise coalesce those portions on which the fusing agent has been printed, whereas, portions that lack fusing agent do not heat sufficiently to melt, sinter, fuse or otherwise coalesce. The heater may include a heating element or lamp that may emit light such as infrared and/or visible light, as examples. The heater may be stationary or may move relative to the platform and the build material thereon. The movement of the heater may be synchronized with the movement of the dispensing device or the movement of the print head.

According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc.

According to various examples, the concepts disclosed herein are applicable to chemical binder systems, including 3D printers that are to use gypsum, metal, or ceramic build material, as examples.

The present disclosure further describes methods for initializing an additive manufacturing process to create a thermally stable build environment prior to fabricating an object/part that may have a design selected by a user and may have a purpose beyond the immediate printing process that formed it. The methods of initialization and finalization disclosed herein may improve the stability and uniformity of, for example, energy transfer and air flow conditions in the build environment of an additive manufacturing system, including a build surface and the layers of build material that it receives. The methods may improve the accuracy of, for example, spatial mapping of temperature data across the build surface. The temperature data is used for closed-loop control of heating during and after the initialization process for improved accuracy. After achieving a stable build environment, fabrication of the 3D object may begin. Using various examples, additive manufacturing systems that incorporate these initialization or finalization methods are disclosed.

When applied in a printing process to produce objects, the initialization and finalization processes disclosed herein may, for example, reduce spatial temperature variation during manufacturing or may provide another process benefit. As comparison to an object printed without having performed any of the initialization or the finalization processes disclosed herein, changes to a printed object built as describe herein may include modified or more uniform material properties within the printed object, greater dimensional accuracy, reduced defects, and greater color accuracy when colors are used. The concepts disclosed herein may allow, for example, objects that are being built to be more closely spaced when building multiple objects simultaneously. Any of these benefits may make a printer more economical to operate or more desirable to use.

Referring now to the view of FIG. 1, an electronic device for additive manufacturing in accordance with the principles disclosed herein is shown. In this example, the electronic device is a 3D printer 100. Printer 100 includes a housing 102 for which a coordinate system may be defined by an x-axis, a y-axis, and a z-axis. In this example, the three axes are orthogonal with the x-axis extending lengthwise (left and right in FIG. 1), the y-axis extending widthwise (into and out of the page in FIG. 1), and the z-axis extending vertically (up and down in FIG. 1). The z-axis may also be called an elevation axis, referring to an elevation of an object that may be built by printer 100.

In housing 102, printer 100 includes an applicator 112 (to apply one or more of a coloring agent, a fusing agent, a detailing agent, or another liquid), a material feed mechanism or dispensing device 116 (to form sequential layers of build material 117 on a build surface 118), a thermal energy source 120, a carriage system 122, a thermal imaging device 123, and a controller 125. Applicator 112 includes a print carriage 114 that carries one or multiple print heads 115 to deliver liquid droplets in selected patterns by spraying or ejection. Print carriage 114, dispensing device 116, and thermal energy source 120 are slidingly mounted to carriage system 122 to move back-and-forth parallel to the x-axis across build surface 118. As examples, carriage system 122 may include a guide bar and a common drive mechanism to move print carriage 114, dispensing device 116, and thermal energy source 120 or may include separate drive mechanisms or guide bars for components 114, 116, 120 to move them together or separately. In some examples, build material 117 is powdered or granular. The detailing agent includes a coolant and may be called a coolant or cooling agent. In various examples, the detailing agent is water or is water-based and may be optically clear. In additive manufacturing processes that do not use a detailing agent, or the detailing agent is not a coolant, then another source of cooling agent may be applied with applicator 112.

Thermal energy source 120 may also be called a heater assembly or fuser module. Thermal energy source 120 includes a plurality of heating elements or lamps to provide radiant heat to build material 117 on build surface 118. Thermal energy source 120 includes an array of warming lamps 160A to provide a first spectrum of radiant thermal energy to heat build material 117, with or without fusing agent, and includes a fusing lamp 160B. Fusing lamp 160B is to provide a second spectrum of radiant thermal energy to apply fusing energy to build material 117 that has been treated with a fusing agent, to convert unfused build material into fused build material. Controller 125 is capable of providing a first power level to the multiple lamps 160A and a second power level to fusing lamp 160B. The first and second power levels may be separately increased, decreased, or maintained by controller 125. In some examples, lamps 160A, 160B include quartz infrared halogen heat sources. Other heater filament configurations, other types of lamps, or other quantities of lamps 160A, 160B may be included in other examples of a thermal energy source. Some examples have a single type of lamp or a single lamp 160.

Controller 125 is to govern the operation of the various components of printer 100. Controller 125 is to cause printer 100 to perform an initialization process that includes depositing and heating multiple preliminary layers of build material. Following the initialization process, the controller 125 is to cause printer 100 to build (e.g., to print) a fused, three-dimensional (3D) object. Various aspects of the heating that occurs during the initialization, printing, and finalization processes are governed by closed-loop control of thermal energy source 120 by controller 125, using temperature measurements from thermal imaging device 123, which may be an infrared (IR) camera.

Thermal imaging device 123 may have a field of view that includes all or a portion of build surface 118. Controller 125 may choose to measure a temperature on all or a portion of build surface 118 using all or a portion of the field of view of imaging device 123. A region of interest (ROI) may be selected to reference the portion of the field of view to be used by imaging device 123 or controller 125 when measuring temperature. The ROI is chosen to view a particular, selected area or region of build surface 118, which may be called a reference area. The term ROI may then refer to a selected group of pixels in imaging device 123 or to the reference area on build surface 118 that is viewed by those pixels. In some examples, controller 125 has established a relationship between an X-Y coordinate system of build surface 118 and the field of view (e.g., the pixels) of imaging device 123, and then the pixels within the selected ROI may be associated with the particular X-Y coordinates of a selected reference area. In some examples, pixels within the selected ROI of the camera are used to establish X-Y coordinates for the reference area on build surface 118 or for build surface 118 as a whole. A measured temperature may be averaged for the entire ROI, which may be called a spatially averaged temperature. In some examples, a measured temperature or multiple measured temperatures taken simultaneously may be evaluated from a portion or from multiple portions of the ROI, respectively.

In the example of FIG. 1, build surface 118 is part of a movable platform 126 disposed in a bin 124. Platform 126 and build surface 118 are vertically adjustable along the z-axis by a drive or lift mechanism 128, being vertically movable relative to dispensing device 116 and thermal energy source 120, as examples. Lift mechanism 128 is to move platform 126 vertically downward along the z-axis in increments to allow build surface 118 to receive sequential layers of build material that build upon the previous layers. The applicator 112 may selectively apply a fusing agent, a cooling agent, a coloring agent, or another liquid to the formed layer of build material. The layer may next be heated by thermal energy source 120 passing over it. Portions of the layer on which fusing agent was applied may melt, sinter, or otherwise coalesce in response to being heated by thermal energy source 120. During this printing process, an upper or outer layer 129 of build material 117 is a build surface 130 for a subsequent layer of build material. Thus, as sequential layers of build material are added, the previous layer is a new build surface 130 for the next layer. In this manner, an object being printed may be built in three-dimensions.

Like various other components, bin 124 with movable platform 126 may be intended for customer-installation into housing 102 or removable from housing 102 to facilitate shipping, for replacement or repair, for removal of a printed object following a print operation, or for another reason. In some examples, bin 124 with platform 126 is mounted in a separate housing. The separate housing may couple to housing 102 to form the assembly.

Figure 2:
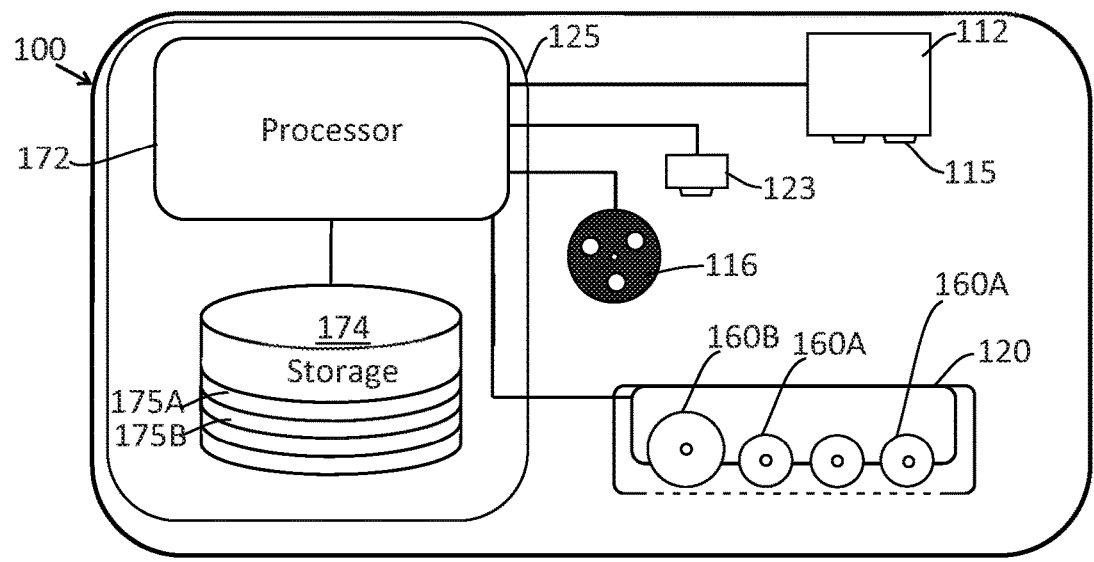
FIG. 2 shows a schematic view of the 3D printer of FIG. 1 in accordance with various examples.

As shown in FIG. 2, controller 125 includes a processor 172 and a computer-readable storage medium storage 174. Controller 125 is coupled for communication with applicator 112, thermal imaging device 123, heat lamps 160A, 160B of thermal energy source 120. Storage 174 stores machine executable code to be executed by processor 172. In various examples, machine executable code may also be called machine readable instructions or computer executable code. The machine executable code stored in storage 174 includes code 175A and code 175B. Code 175A includes instructions that, when executed by controller 125, cause controller 125 (e.g., its processor 172) to perform various operations in printer 100, including the fabrication of 3D objects based on predefined design information or received design information. Code 175B includes instructions that, when executed by controller 125, cause controller 125 to perform various operations, including an initialization process and a finalization process for printer 100, as is disclosed herein according to various examples.

Figure 3A:
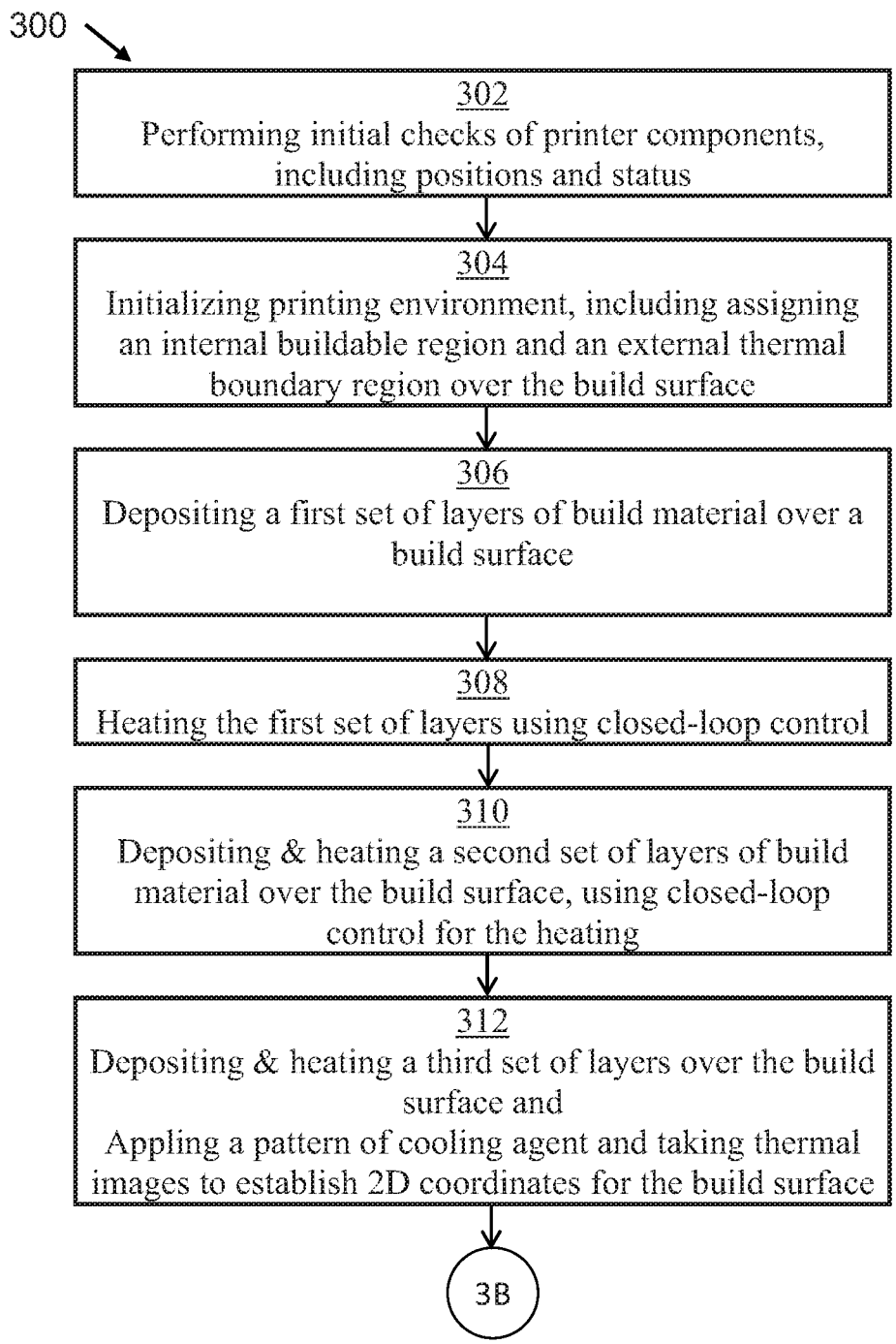
FIGS. 3A, 3B, & 3C show a flow diagram of a method of operating an additive manufacturing process, such as the 3D printer of FIG. 1, in accordance with various examples.
Figure 3B:
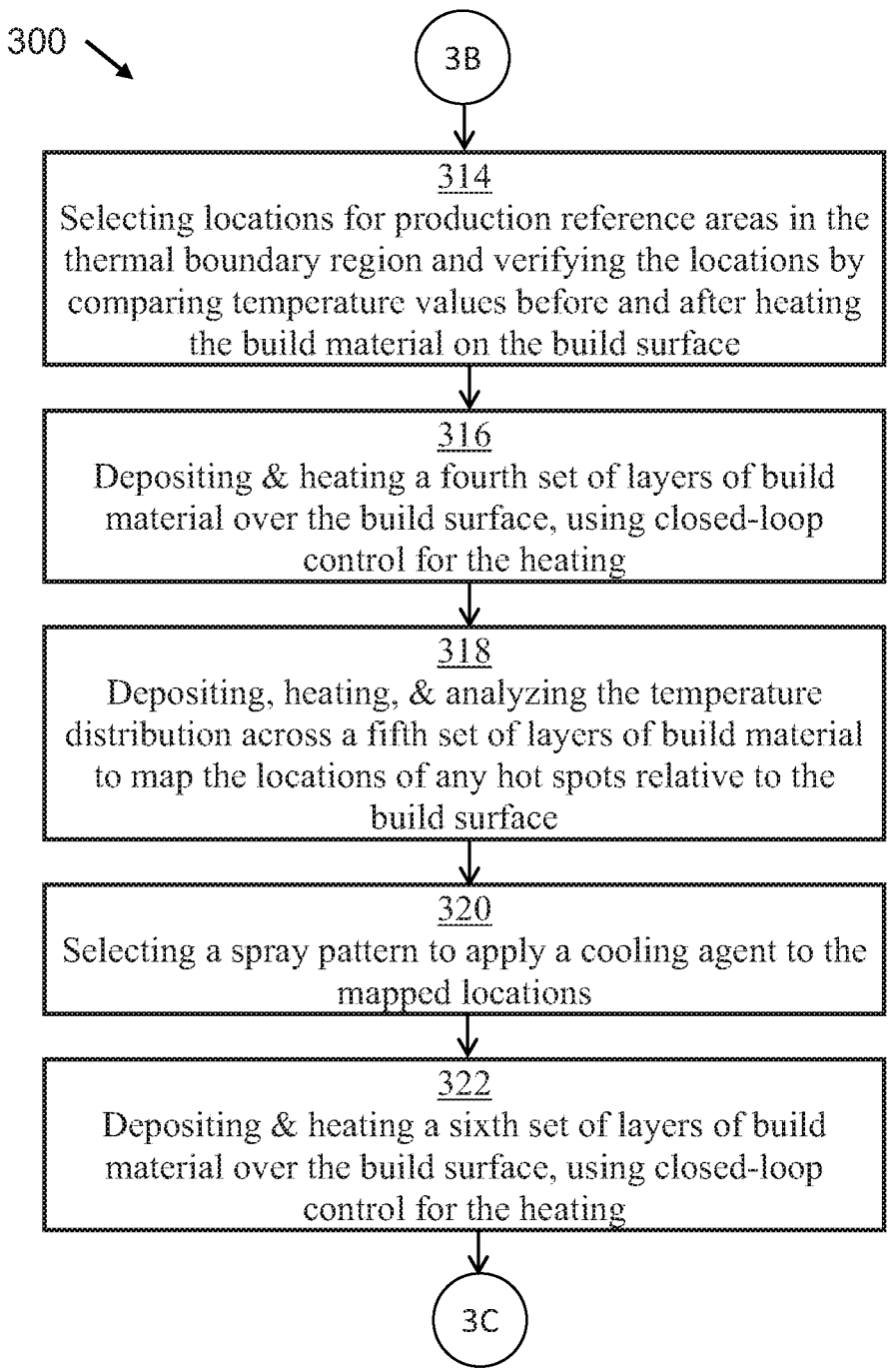
Figure 3C:
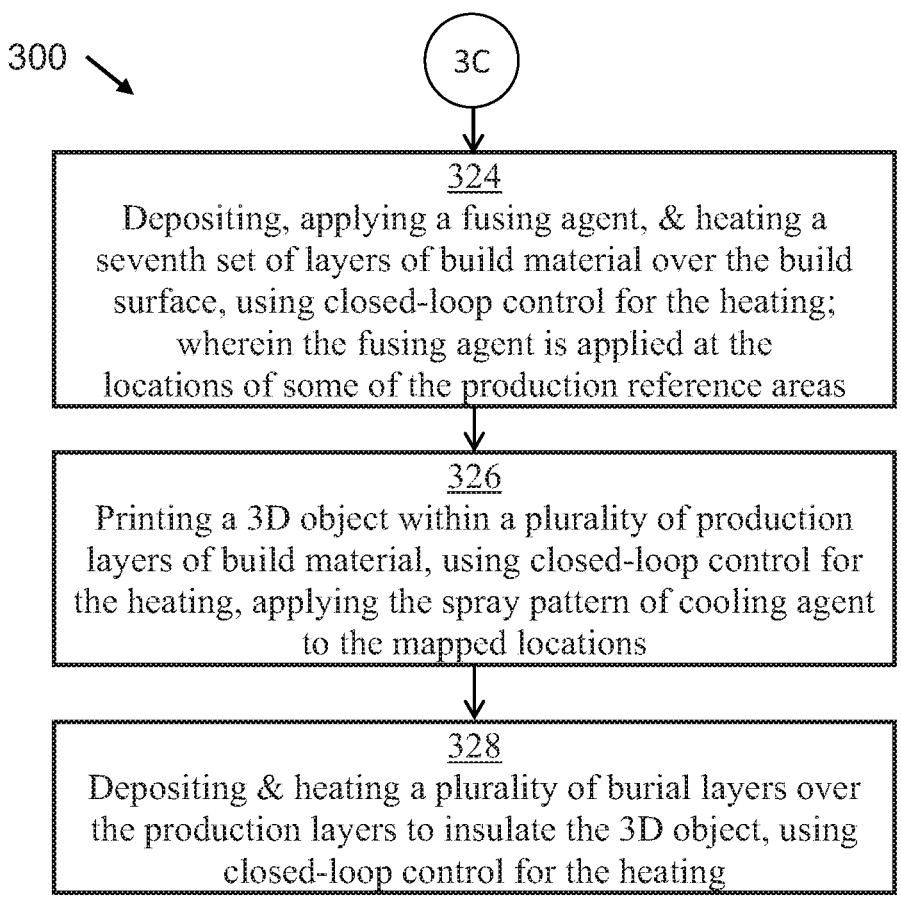

Referring now to the flow chart of FIGS. 3A, 3B, & 3C, an example is depicted of a process or method 300 for operating an additive manufacturing process. Method 300 includes a process for initializing printer 100. In various examples (such as FIG. 3C), method 300 includes a process for performing 3D printing activity to produce a user-selected or user-configured 3D object after initialization is completed. Examples of utilizing method 300 will be explained in terms of operations of printer 100, as may be accomplished by various components governed by controller 125 executing various portions of code 175A or 175B (FIG. 2). Method 300 may be applicable to other additive manufacturing systems as well. The discussion of method 300 will be aided by FIG. 4, which shows a top view of printer 100 prior to adding any layers of build material, and by FIG. 5, which shows a side view of printer 100 with preliminary layers of build material deposited over platform 126. In general, initializing printer 100 according to method 300 includes depositing a plurality of preliminary layers 190 of build material 117 over a build surface 118, 130 and applying thermal energy 162 from thermal energy source 120 governed by controller 125 using closed-loop control to heat the preliminary layers 190 (e.g., FIG. 5). The preliminary layers 190 are to be placed over build surface 118 prior to adding a plurality of production layers that are to include a 3D object that is to be produced by printer 100 and may be intended for use after the printing process is completed. The preliminary layers 190 comprise several sets of layers, and some of these sets of layers are processed differently than other sets of layers, as will be described below. FIG. 5 shows some of the preliminary layers 190 that are to be formed or deposited in accordance with method 300. The horizontal dashed lines in the build material 117 represent boundaries between adjoining sets of layers 191, 192, 193 within preliminary layers 190. In some examples, a layer of build material within the preliminary layers 190 has a thickness of 80 micrometers. In other examples, a layer has thicknesses that is greater than or is less than 80 micrometers. In FIG. 5, dispensing device 116 is vertically retracted from build surface 130 during a heating pass performed by thermal energy source 120.

Referring to FIG. 3A, at block 302 of method 300, controller 125 is to perform initial checks of printer components, which may include determining the positions and status of applicator 112, dispensing device 116, and build surface 118 of platform 126.

Referring now to FIG. 3A and FIG. 4, at block 304 controller 125 is to initialize a printing environment, including assigning or dividing build surface 118 to include a buildable region 182 having a perimeter 184 and a thermal boundary region 186 disposed outside the perimeter 184. FIG. 4 represents a time prior to depositing build powder, so the current build surface 130 may coincide with the physical build surface 118 of platform 126. Controller 125 is to establish or select a size and a location for an initialization reference area 188, which may also be called a region of interest (ROI), over build platform 126, on the current build area. For example, controller 125 may select reference area 188 to be within buildable region 182 and may select this reference area 188 to be positioned at the center of buildable region 182. Selecting a reference area or ROI involves choosing which pixels within thermal imaging device 123 are to be used for temperature measurements. In conjunction with some heating activities operated by closed-loop control during the initialization process, temperatures are to be measured within reference area 188 using thermal imaging device 123 and are to be compared with a temperature set-point. As a result of the temperature comparison, controller 125 may cease or pause the heating of a layer of build material and may change to another activity of the initialization process, or controller 125 may reduce or increase a power level to thermal energy source 120 and continue with the current activity.

Referring again to FIG. 3A and FIG. 5, at block 306 printer 100 is to deposit a first set of layers 191 of build material 117 over build surface 118 of platform 126. The first set of layers 191 may be placed directly on build surface 118, for example. (Note: In addition to showing the first set of layers 191, FIG. 5 also shows a few subsequent sets of layers and various operations that occur after block 306.) At block 308, printer 100 is to heat the first set of layers using closed-loop control to achieve a first temperature set-point. In this example, all layers of the first set of layers are deposited before thermal energy is applied to them. Thermal energy source 120 is to move back and forth over build area 118 a plurality of times during the heating. When the first set-point temperature is achieved, controller 125 is to cause thermal energy source 120 to stop traveling over build area 118 and cease heating the first set of layers. In some examples, applying thermal energy governed by closed-loop control to heat the first set of layers includes utilizing a fixed power level for thermal energy source 120. In some examples, one or both power levels for lamps 160A, 160B (FIG. 1) may be a fixed power level. In some examples, the first set includes layers of build material that add up to a bed thickness of approximately 5 mm.

Continuing to reference FIG. 3A and FIG. 5, at block 310, printer 100 is to deposit and heat a second set of layers 192 of build material 117 over build surface 118 and over the first set of layers 191, using closed-loop control for heating to achieve a second temperature set-point, which may be equal to the first temperature set-point or may be a different value. In some examples of block 310, and during some other initialization activities, controller 125 is to cause material dispensing device 116, print heads 115 of liquid applicator 112, thermal energy source 120, and possibly other components of printer 100 to move or operate in a manner or sequence that mimics 3D printing activity. The term "3D printing activity" refers to operations of printer 100 that may be used to produce a 3D object or objects in the buildable region 182 of layers of build material. Thus, in general, 3D printing activity includes spraying (e.g., printing) one or more of fusing agent, detailing agent, and other liquid agents within buildable region 182. In general, mimicking 3D printing activity does not include the production of a 3D object in buildable region 182; instead build material in buildable region 182 remains unfused. In some examples, of mimicking 3D printing activity, applicator 112 is caused to pass over the various layers of build material after each layer is deposited, but applicator 112 applies no fusing agent or no coloring agent on the layers of build material. In some examples for some layers, applicator 112 applies none of the liquid agents on the layers of build material while printer 100 mimics a 3D printing process during initialization. In some examples, applicator 112 sprays a minimal amount fusing agent, coloring agent, or another liquid agent on the layers of build material. In some examples of mimicking 3D printing activity, applicator 112 sprays fusing agent in the thermal boundary region 186 but sprays minimal or no fusing agent buildable region 182, and as a result, minimal or no build material is fused in region 182 during this phase of the operation. In some examples of mimicking 3D printing activity, applicator 112 sprays cooling agent in thermal boundary region 186 or in buildable region 182. Mimicking 3D printing activity may include causing thermal energy source 120 to make multiple passes over an individual layer of build material prior to dispensing device 116 depositing the next layer of a plurality of layers, as may be performed during actual 3D printing activity.

In the process of completing block 310, applying thermal energy to heat the second set of layers occurs between the depositions of various layers of the second set and may occur, for example, between individual layers. Thus, moving thermal energy source 120 over the build area is initiated and terminated a plurality of times while depositing the second set of layers. In block 310, applying thermal energy governed by closed-loop control includes measuring a temperature in reference area 188 (FIG. 4) and regulating a power level of the thermal energy source 120 based on the temperature in the reference area in comparison to the second temperature set-point. In some examples, controller 125 utilizes a fixed power level for thermal energy source 120 while heating a first portion of the second set of layers and utilizes a variable power level while heating a second portion of the second set of layers. In some examples, the second set includes one hundred fifty layers of build material.

Still referring to FIG. 3A and FIG. 5, at block 312, printer 100 is to deposit a third set of layers 193 over build surface 118 and over the second set of layers 192. After depositing a layer of the third set, printer 100 is to heat the layer using closed-loop control of thermal energy source 120 to achieve a third temperature set-point, which may be equal to one of the temperature set-points mentioned above or may be a different value. Applicator 112 of printer 100 is to apply cooling agent 198 in a selected two-dimensional (2D) pattern 199 across the layer and is to take a thermal image with imaging device 123 and controller 125. Due to its intended use, pattern 199 for cooling agent may be called a mapping pattern 199. FIG. 5 shows a portion of mapping pattern 199. In some examples, mapping pattern 199 includes multiple circles. This process that includes deposition, heating, and applying the mapping pattern of cooling agent may be repeated for a plurality of the layers of the third set 193. In some examples, the third set includes five layers of build material. A current build surface 130 and the buildable region 182 are shown in FIG. 5 for reference.

Continuing with block 312, based on thermal image data from the plurality of the layers of the third set 193, printer 100 is to utilize or to establish two-dimensional (2D) coordinates for the build surface 118, e.g., X-Y coordinates. In some examples, evaluating the thermal image or images to utilize or to establish the 2D coordinates includes determining the center of those circles relative to pixels in thermal imaging device 123, relative to the build area 118, 130, or relative to the range of travel of applicator 112. Examples of some of the activities and the results of block 312 are provided in Patent Cooperation Treaty Patent Application No. PCT/US2018/037962.

FIG. 6 shows a top view of printer 100 as it may appear during the initialization process of method 300 following block 312. Preliminary layers 190 of build material 117 are deposited over platform 126. A current build surface 130 is visible. FIG. 6 includes many of the reference numerals described for FIG. 4, including buildable region 182 and thermal boundary region 186.

In general during 3D printing, temperature measurements may be taken in reference areas inside or outside buildable region 182 by thermal imaging device 123. These temperature measurements may help calibrate and control manufacturing components and processes. Up to this point in the printer initialization process of the present example, temperature measurements for closed-loop control of heating have been made in initialization reference area 188 located inside buildable region 182. After the initialization process is completed, while production layers are deposited, temperature measurements are made outside buildable region 182, within thermal boundary region 186, which may include production reference areas that are to be defined in block 314, discussed below. During the remainder of the initialization process, controller 125 may select initialization reference area 188, a production reference area, or another reference area for temperature measurements.

Referring now to FIG. 3B and FIG. 6, at block 314, printer 100 is to select locations for a plurality of production reference areas within thermal boundary region 186, outside buildable region 182, based on the 2D coordinates developed in block 312. In this example, three production reference areas 201, 202, 203 are defined with reference areas 201, 203 having equal size and reference area 202 being larger than areas 201, 203 and disposed between areas 201, 203. In FIG. 6, the perimeter of each reference area 201, 202, 203 is depicted by dashed lines. Later, reference areas 201, 202, 203 provide locations where temperature measurements of fused build material may be made consistently without including an area that may have layers that fluctuate between fused and unfused build material, as may occur in buildable region 182 when a 3D object is being printed therein. A goal is to position each reference area 201-203 at a location where the temperature of the build material is the same as, at a constant difference from, or otherwise corresponds uniformly to the temperature of build material in the buildable region during manufacturing. The temperature of build material in each reference area can then be used to accurately represent the temperature of build material in the buildable region to control fusing energy and other process parameters. In one example, the location of the reference areas remains unchanged during manufacturing and, accordingly, the location of each reference area may be mapped to specific camera pixels that also do not change during manufacturing. In another example, a reference area may be moved during manufacturing, for example, to optimize the location for each layer of build material, and camera pixels are remapped to the new location in real time based on a mapping transform function.

Block 314 continues with printer 100 measuring temperatures in the reference areas 201, 202, 203 before a pass over the layers of build material is made with thermal energy source 120. Printer 100 continues measuring temperatures in the reference areas 201, 202, 203 after the heating pass is completed. Controller 125 compares the temperatures in areas 201, 202, 203 before the heating pass to the temperatures in areas 201, 202, 203, respectively, after the heating pass. Prior to this particular pass of energy source 120, the layers of build material had been heated by energy source 120. This latest heating pass again irradiates the upper surface of the build material with thermal energy. As a result of these heating activities and the time transpired between them, the temperatures before and the temperatures after the heating pass should differ by no more than a predetermined threshold temperature difference, which is 3° C. in some examples. If controller 125 determines that the actual temperature difference is greater than the threshold temperature difference, a reference area 201, 202, 203 may be misplaced and not correspond to a location where build material has been deposited. In this situation, controller 125 is to reselect the misplaced reference area 201, 202, 203 or all of these reference areas. If, instead, the actual temperature differences are all equal to or less than the threshold temperature difference, the initiation process proceeds. Thus, controller 125 verifies the locations of the reference areas by comparing before and after temperature values that result from applying thermal energy to the build surface. Examples of some activities and results of block 314 are provided in Patent Cooperation Treaty Patent Application No. PCT/US2018/037962.

At block 316, the initiation process is to continue, and printer 100 is to deposit a fourth set of layers of build material over build surface 118 and over the third set of layers and is to heat the fourth set using closed-loop control of thermal energy source 120 to achieve a fourth temperature set-point, which may be equal to one of the temperature set-points mentioned above or may be a different value. Controller 125 and thermal imaging device 123 continue to take temperature measurements in initialization reference area 188. Moving thermal energy source 120 over the build area to apply thermal energy may occur between the depositions of various layers of the fourth set, for example, between each layer of the fourth set. Controller 125 is to cause the components of printer 100 to mimic 3D printing activity. In some examples, the fourth set includes 45 layers of build material.

At block 318, printer 100 is to deposit, heat, and analyze the temperature distribution across a fifth set of layers of build material to map the locations of any hot spots relative to the build surface. The fifth set is deposited over build surface 118 and over the fourth set of layers. Heating is to be performed by closed-loop control of thermal energy source 120 to achieve a fifth temperature set-point, which may be equal to one of the temperature set-points mentioned above or may be a different value. Moving thermal energy source 120 over the build area to apply thermal energy occurs between the depositions of various individual layers of the fifth set. Controller 125 is to cause the components of printer 100 to mimic 3D printing activity. Between depositing and heating the various individual layers, controller 125 is to cause thermal imaging device 123 to measure temperatures across the extent of buildable region 182, which may be called a temperature distribution for region 182. Controller 125 is to analyze the temperature distribution to map or record the locations of any hot spots. A hot spot may be defined, for example, as a region that has a temperature that is more than 3° C. higher than the average temperature of buildable region 182. Thus, in some examples, a determination of hot spots is to be performed based on the deposition and heating of a plurality of layers. The size of hot spots may be resolved to an area on the build surface that corresponds to any single pixel or corresponds to a selected number of pixels of imaging device 123. In some examples, the fifth set includes ten layers of build material.

At block 320, based on the analysis of box 318, controller 125 is to select a cooling spray pattern for applicator 112 to apply a cooling agent to the mapped locations of the hot spots when depositing and heating future layers of build material. The goal of the cooling spray pattern is to achieve a more uniform temperature across build surface 130, or at least across the buildable region 182, after thermal energy source 120 heats build surface 130.

At block 322, printer 100 is to deposit a sixth set of layers of build material over build surface 118 and over the fifth set of layers and is to heat the sixth set using closed-loop control of thermal energy source 120 to achieve a sixth temperature set-point, which may be equal to one of the temperature set-points mentioned above or may be a different value. Moving thermal energy source 120 over the build area to apply thermal energy may occur between the depositions of various individual layers of the sixth set of layers. Controller 125 is to cause the components of printer 100 to mimic 3D printing activity. In some examples, the sixth set includes fifteen layers of build material.

Referring now to FIG. 3C, at block 324, printer 100 is to deposit a seventh set of layers of build material 117 over build surface 118 and over the sixth set of layers, to apply fusing agent to reference areas 201, 203 on the various layers of the seventh set, and to heat the various layers using closed-loop control of thermal energy source 120. With the application of fusing agent, reference areas 201, 203 define reference layers within the layers of the seventh set. The reference layers include build material and fusing agent. As the layers of the seventh set are vertically stacked and heated, the fusing energy from thermal energy source 120 causes the vertically stacked reference layers to become a first and a second fused vertical columns, which may be called reference objects. A 3D reference object extends from area 201 and another 3D reference object extends from area 203 in the thermal boundary region 186. These 3D reference objects are intended for a purpose within the printing process that forms them and, in some examples, may have no purpose after the printing process is completed. That purpose is to provide surface areas having thermal properties that are consistent, non-changing as more and more layers of build material are added. As a result, a temperature measurement made in a reference areas 201, 203 (e.g., on reference layers of the reference objects) may be used to estimate a temperature of a portion of the buildable region 182 that includes fusing agent or fused material when production layers are built after the initialization process is completed. Reference area 202 may be used to estimate a temperature of another portion of the buildable region 182. Reference area 202 defines a surface of build material lacking fusing agent or having too little fusing agent to allow build material to fuse together. Temperature measurements in reference area 202 may be used to estimate temperatures in uncoated or unfused portions of buildable region 182 during the initialization process or while production layers are built after the initialization process is completed.

During the closed-loop control of thermal energy source 120 in block 324, controller 125 is to cause imaging device 123 to take thermal images of the three production reference areas 201, 202, 203. Controller 125 is to compare the temperatures of reference areas 201, 203, to which fusing agent has been applied, with a seventh temperature set-point and is to regulate the power level of fusing lamp 160B, adjusting it when appropriate. Controller 125 is to compare the temperature of reference area 202 with an eighth temperature set-point and is to regulate the power level of warming lamps 160A, adjusting it when appropriate. In some examples, the seventh set includes seventy-five layers of build material. Examples of some of the activities and the results of block 324 are provided in the international patent application PCT/US2017/055105, filed Oct. 4, 2017, which is incorporated herein by reference for all purposes. In the present example, block 324 represents the completion of an initialization process of printer 100, and the preliminary layers include the first set, the second set, the third set, the fourth set, the fifth set, the sixth set, and the seventh set of layers of build material.

In various examples, the heating of the layers of the preliminary layers may include a single pass or may include multiple passes of thermal energy source 120 over build surface 118, 130 between depositing a first individual layer and then a second individual layer. In the disclosed example of method 300, this possibility may be applied to any of the layers of the second set through the seventh set of layers. Furthermore, any of the second through the eighth temperature set-points, which are single-valued, may be replaced by multiple temperature set-points for energy source 120 to heat a layer of build material using multiple passes. So too, the single-valued first temperature set-point for the first set of layers may also be replaced with multiple temperature set-points when energy source 120 makes multiple passes to heat the first set of layers.

Referring FIG. 3C and FIG. 7, at block 326, printer 100 is to perform 3D printing activity. Printer 100 sprays (e.g., prints) fusing agent within a plurality of production layers 230 of build material to form a user selected or configured 3D object 232. FIG. 7 includes many of the reference numerals described for FIG. 6. In various examples, the 3D object 232 is designed or intended for a purpose beyond the printing process of method 300. In this process, dispensing device 116 is to deposit a plurality of production layers of build material over build surface 118 and over the preliminary layers. Governed by controller 125, applicator 112 is to apply selectively a fusing agent to various layers of the production layers 230 to form a plurality of vertically stacked object layers 232 and a plurality of vertically stacked production reference layers 241, 243 in the production layers 230. With respect to a horizontal plane, the object layers are located in the buildable region 182 and the production reference layers are located in thermal boundary region 186. An object layer 234 is visible on the current build surface 130. In addition to the fusing agent, controller 125 may also cause applicator 112 to apply selectively coloring agent, cooling agent, or another liquid agent based on a design for the 3D object 234. The expression "object layer" refers to the portion or portions of build material that receive fusing agent within buildable region 182 to produce 3D object 234. Production reference layers 241, 243 refer to the build material within production reference areas 201, 203, which also receive fusing agent. The reference layers in thermal boundary region 186 are horizontally spaced apart from the object layers in buildable region 182.

Still at block 326, printer 100 with controller 125 is to heat individual layers of the production layers using closed-loop control of thermal energy source 120 to achieve the seventh temperature set-point within production reference areas 201, 203 and to achieve the eighth temperature set-point within production reference area 202, as described for block 324 with respect to the seventh set of preliminary layers. The seventh temperature set-point and the eighth temperature set-point may also be called production temperature set-points. The seventh temperature set-point corresponds uniformly to a desired temperature set-point for the fused build material in the object layers 234 in buildable region 182. The eighth temperature set-point corresponds uniformly to a desired temperature set-point for the uncoated or unfused build material in buildable region 182. Thus, applying thermal energy governed by closed-loop control to heat the production layers includes measuring a temperature in the thermal boundary region 186 outside the buildable region 182 and comparing that temperature with a production temperature set-point. In block 326, the application of thermal energy fuses the object layers 234 to become a three-dimensional object 232 and fuses the production reference layers 241, 243 in reference areas 201, 203 to become part of the first fused vertical column and a second fused vertical column or reference objects that were started in the preliminary layers 190 according to block 324. Reference numerals 241, 243 may be used to identify both the production reference layers and the reference objects that are formed from these layers. Applicator 112 is to apply cooling agent across build surface 130 according to the cooling spray pattern established in block 320 for achieving a more uniform temperature across the build surface 130. This application of cooling agent using the cooling spray pattern is in addition to any cooling agent that was applied based on a design for the 3D object, which was discussed above. In some examples, the cooling spray pattern is applied a plurality of times per layer of build material, after each pass of thermal energy source 120. In various examples, none of the 3D object extends into the preliminary layers of build material. In some other examples, a portion of the 3D object may extend into or be fused to build material in some of the preliminary layers.

Thus, during the activities of blocks 302 to 324, little or no fusing agent is applied within the buildable region 182, but at block 326, fusing agent is applied within the buildable region 182 in sufficient quantities to produce a 3D object 232 in buildable region 182 that is separated from reference objects 241, 243 formed in thermal boundary region 186. The spray pattern for fusing agent and other liquid agents may change from one production layer to the next. As a result of method 300, a majority of the preliminary layers lack build material that is fused to the 3D object 232 that is to be formed in buildable region 182 due to block 326. As is to be understood from the term majority, in some examples, the majority of the preliminary layers includes all the preliminary layers. The 3D reference object 232 in area 201, 203, which is to be used for temperature control, may be spaced apart from the 3D object. In various examples, the 3D object to be built in buildable region 182 due to block 326 is designed or intended for a purpose beyond the printing process that forms it.

At block 328, printer 100 is to perform a finalization process that includes applying thermal energy using closed-loop control. Printer 100 is to deposit and heat a plurality of burial layers over the build surface and over the production layers to insulate the 3D object in the production layers. The heating is to be performed by closed-loop control of thermal energy source 120. In some examples, controller 125 is to measure temperatures in reference region 202 using thermal imaging device 123 and is to regulate the power level of warming lamps 160A to achieve a burial temperature setpoint while operating fusing lamps 160B at a constant power level during the burial phase. Thus, in this example, heating is to be performed by closed-loop control of warming lamps 160A while fusing lamps 160B are to be operated in an open-loop mode. In some examples, the application of thermal energy for heating is performed between depositing various burial layers. The order of execution or completion of some of the blocks in method 300 may be modified in various examples.

Figure 8:
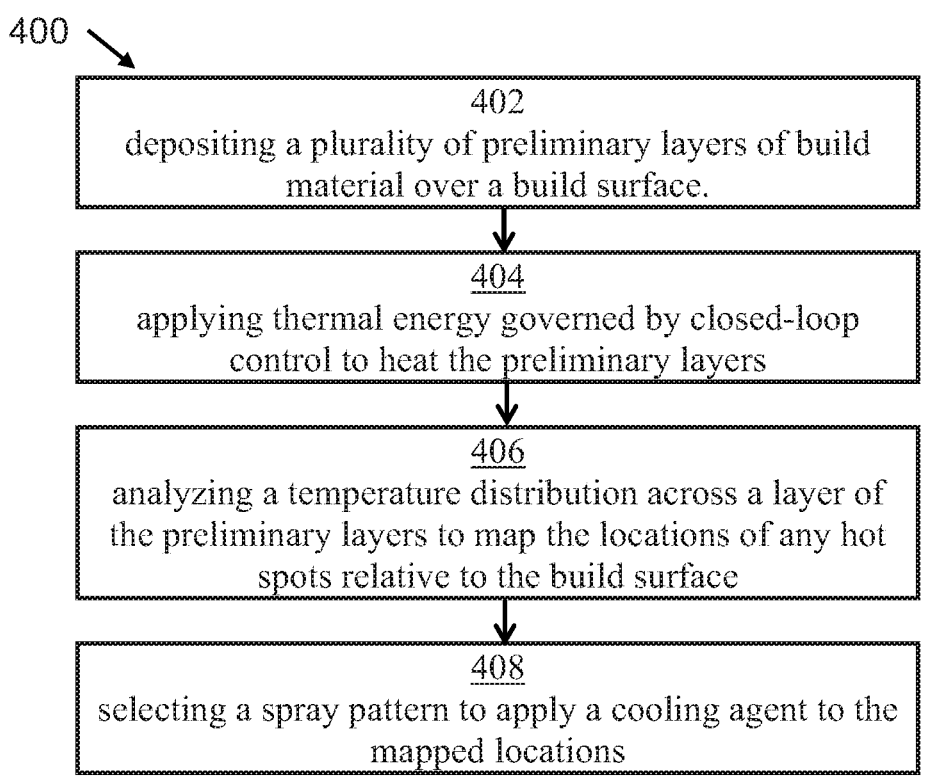
FIG. 8 shows a flow diagram of another method of operating an additive manufacturing process, such as the 3D printer of FIG. 1 in accordance with various examples.

FIG. 8 shows a method 400 for operating an additive manufacturing process in accordance with various examples described herein. At block 402, method 400 includes depositing a plurality of preliminary layers of build material over a build surface. Block 404 includes applying thermal energy governed by closed-loop control to heat the preliminary layers. Block 406 includes analyzing a temperature distribution across a layer of the preliminary layers to map the locations of any hot spots relative to the build surface. Block 408 includes selecting a spray pattern to apply a cooling agent to the mapped locations. In these operations, method 400 includes several of the concepts described with regard to method 300 and may be implemented using printer 100 governed by controller 125, as an example. Various examples of method 400 may include fewer operations than described, and other examples of method 400 include additional operations. In various examples, after completing blocks 402-408 of method 400, a 3D object is produced in production layers that are to be disposed above the preliminary layers and a majority of the preliminary layers lack build material that is fused to the 3D object. In addition, a reference object to be used for temperature control may be built in a location that is spaced apart from the 3D object.

Figure 9:
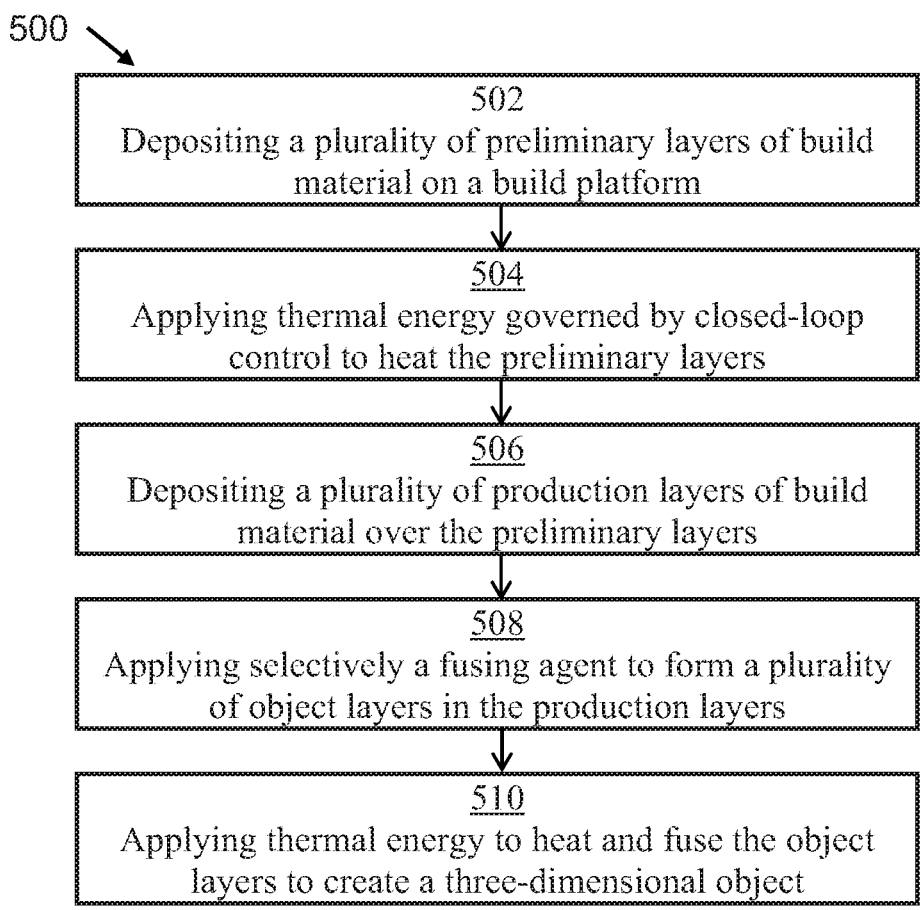
FIG. 9 shows a flow diagram of a still another method of operating an additive manufacturing process, such as the 3D printer of FIG. 1 in accordance with various examples.

FIG. 9 shows a method 500 for operating an additive manufacturing process in accordance with various examples described herein. At block 502, method 500 includes forming a plurality of preliminary layers of build material on a build platform. Block 504 includes applying thermal energy governed by closed-loop control to heat the preliminary layers. Block 506 includes forming a plurality of production layers of build material over the preliminary layers. Block 508 includes applying selectively a fusing agent to form a plurality of object layers in the production layers. Block 510 includes applying thermal energy to heat and fuse the object layers to create a three-dimensional object. As a result of method 500, a majority of the preliminary layers lack build material that is fused to the 3D object. A 3D reference object to be used for temperature control may be built in addition to and spaced apart from the 3D object. In these operations, method 500 includes various concepts described with regard to method 300 and may be implemented using printer 100 governed by controller 125, as an example. Various examples of method 500 may include fewer operations than described, and other examples of method 500 include additional operations. In various examples, the 3D object is formed in a buildable region, such as buildable region 182 (FIG. 7) that is surrounded by a thermal boundary region 186.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An additive manufacturing system comprising:
    a dispensing device to deposit a build material over a build surface;
    an applicator to apply selectively a fusing agent and to apply selectively a cooling agent to the build material;
    a thermal energy source to heat the build material;
    a thermal imaging device to measure a temperature of the build material on the build surface; and
    a controller to cause:
        the dispensing device to deposit a plurality of preliminary layers of the build material on the build surface;
        the thermal energy source to heat the preliminary layers by closed-loop control;
        the thermal imaging device to measure a temperature distribution across a layer of the plurality of the preliminary layers;
        the dispensing device to deposit a plurality of production layers of the build material above the plurality of preliminary layers;
        the applicator to apply the cooling agent to a layer of the plurality of production layers according to a spray pattern that is selected based on the temperature distribution;
        the applicator to apply selectively the fusing agent to form a plurality of object layers in the production layers; and
        the thermal energy source to heat and fuse the object layers to create a three-dimensional object, wherein the three-dimensional object is located within the object layers and above the preliminary layers,
    wherein the system is controlled not to fuse a majority of the build material in a majority of the preliminary layers.

2. The system of claim 1
wherein the controller is to:
analyze the temperature distribution to map locations of any hot spots relative to the build surface; and
select the spray pattern to apply the cooling agent to the mapped locations.

3. The system of claim 1 wherein the controller is to divide the plurality of preliminary layers to include a first set of layers and a second set of layers,
wherein the controller is to cause the dispensing device to spread the first set of layers before causing the thermal energy source to heat the first set of layers, and
wherein controller is to cause the dispensing device to spread an individual layer of the second set of layers and to cause the thermal energy source to heat the individual layer before causing the dispensing device to spread a subsequent layer of the second set of layers and before causing the thermal energy source to heat the subsequent layer.

4. The system of claim 1 wherein the controller is to divide the plurality of preliminary layers to include a first set of layers and a second set of layers,
wherein the controller is to provide a fixed power level to the thermal energy source to heat the first set of layers and is to provide a variable power level to the thermal energy source to heat the second set of layers.

5. The system of claim 1,
wherein the controller is to divide the build surface to include a buildable region having a perimeter and a thermal boundary region disposed outside the perimeter of the buildable region,
wherein the controller is to cause the thermal imaging device to make a plurality of temperature measurements in the buildable region and is to control the thermal energy source based on the temperature measurements from the buildable region to heat the preliminary layers, and
wherein the object layers are to be formed over the buildable region,
wherein the controller is to cause the thermal imaging device to make a plurality of temperature measurements in the thermal boundary region and is to control the thermal energy source based on the temperature measurements from the thermal boundary region to heat the production layers, including the object layers.

6. An additive manufacturing system comprising:
a build surface;
a dispensing device;
an applicator;
a thermal energy source;
a thermal imaging device; and
a controller coupled to the dispensing device, the applicator, the thermal energy source, and the thermal imaging device, the controller to cause:
the dispensing device to deposit a preliminary layer of a build material on the build surface;
the thermal energy source to heat the preliminary layer;
the thermal imaging device to measure a temperature distribution across the preliminary layer;
the dispensing device to deposit a production layer of the build material above the preliminary layer;
the applicator to apply a cooling agent to the production layer according to a spray pattern that is selected based on the temperature distribution;
the applicator to apply a fusing agent to a portion of the production layer; and
the thermal energy source to heat and fuse the build material within the portion of the production layer,
wherein the system is controlled not to fuse the build material in the preliminary layer.

7. The system of claim 6 wherein the controller is to:
analyze the temperature distribution to map locations of any hot spots relative to the build surface; and
select the spray pattern to apply the cooling agent to the mapped locations.

8. The system of claim 6 wherein the controller is to:
divide the build surface to include a buildable region having a perimeter and a thermal boundary region disposed outside the perimeter of the buildable region,
cause the thermal imaging device to make a plurality of temperature measurements in the buildable region and is to control the thermal energy source based on the temperature measurements from the buildable region to heat the preliminary layer.

* * * * *